(12) United States Patent
Hosokawa et al.

(10) Patent No.: US 6,325,950 B1
(45) Date of Patent: Dec. 4, 2001

(54) METHOD FOR PRODUCING OPTICAL DISC SUBSTRATES

(75) Inventors: Takao Hosokawa; Koichi Warino, both of Tsukuba (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/175,961

(22) Filed: Oct. 21, 1998

(51) Int. Cl.⁷ .................................................. B29D 11/00
(52) U.S. Cl. ...................................... 264/1.33; 264/328.1
(58) Field of Search ................................. 264/1.33, 106, 264/107, 328.1; 425/810; 428/412

(56) References Cited

U.S. PATENT DOCUMENTS

| | | | |
|---|---|---|---|
| 5,412,016 | * | 5/1995 | Sharp . |
| 5,458,818 | * | 10/1995 | Kim et al. ........................... 425/810 |
| 5,683,630 | * | 11/1997 | Inoue .................................. 264/1.33 |
| 5,720,994 | * | 2/1998 | Asai .................................... 264/1.33 |
| 5,783,653 | * | 7/1998 | Okamoto ............................ 428/412 |
| 5,785,793 | * | 7/1998 | Arai et al. ......................... 156/272.2 |
| 5,897,814 | * | 4/1999 | Niemeyer et al. .................. 264/107 |

OTHER PUBLICATIONS

Asano, Shoji, et al., "Optical Property of Plastic Substrate for Optical Disk," *Reports in Optical Memory Symposium*, pp. 173–178, (1986). (English abstract).

Ranbunshu, Kobunshi, *Polymer Reports*, vol. 49, No. 8, pp. 703–709, (1992).

* cited by examiner

Primary Examiner—Mathieu D. Vargot
(74) Attorney, Agent, or Firm—Oblon, Spivak, McClelland, Maier & Neustadt, P.C.

(57) ABSTRACT

Provided is a method for producing optical disc substrates having a low degree of birefringence. The method has good mass-producibility, in which the pattern transferability on the substrates produced is good. In producing optical disc substrates having a diameter of from 80 to 120 mm and a thickness of from 0.5 to 0.7 mm, through injection molding or injection-compression molding, a resin for the substrates is injected and charged into the cavity of a mold at a resin filling rate of not lower than 65 cm³/sec, said resin filling rate being obtained by dividing the cavity volume (cm³) of the mold, into which the resin is charged, by the time (sec) taken from the start of resin injection through the tip of the nozzle of the injection-molding machine to the arrival of the resin at the deepest end of the cavity of the mold.

5 Claims, 3 Drawing Sheets

METHOD FOR PRODUCING OPTICAL DISC SUBSTRATES

FIELD OF THE INVENTION

The present invention relates to a method for producing optical disc substrates.

BACKGROUND OF THE INVENTION

Optical discs which have heretofore been developed include read-only discs such as compact discs (CD), laser discs (LD), etc.; rewritable discs such as magneto-optical discs (MO discs), etc.; and write once discs such as recordable CD (CD-R), etc. FIG. 3 is a perspective view schematically showing one example of such conventional optical discs. As in FIG. 3, in general, an optical disc comprises a substrate with guide grooves (or pits) 1, 2, each having a track pitch P of a predetermined size and a predetermined depth D. For reading or rewriting the information recorded in the optical disc, a laser ray having been focused through a lens to have a wavelength of about 800 nm is irradiated to the pits or to the recorded information on the guide grooves. The information capacity of conventional optical discs is about 640 MB/disc.

Recent developments in the multimedia industry are noticeable. With those, desired are high-density optical discs which can record large-capacity information such as image information and are compact. However, conventional CD and MO discs could not meet the requirements in the market, as their memory capacity is insufficient.

Given that situation, high-density read-only optical discs (so-called DVD) having a diameter of 120 mm, which is the same as that of CD, but having a recording density (4.7 GB) of at least 7 times that of CD are being developed (for example, see "Industrial Materials", Vol. 44, No. 10, pp. 103–105, 1996). DVD comprises a laminate of two substrates, each of which is thinner than the substrate of conventional optical discs. The laser ray to be used for reading the information recorded on DVD has a wavelength of 650 nm or 635 nm. Therefore, the wavelength of the laser ray to be used for reading the information recorded on DVD is shorter than that (about 800 nm) of the laser ray for reading CD. The wavelength of the laser ray to be used for reading the recorded information is in proportion to the spot diameter of the layer ray as focused through a lens. Using a laser ray having a shorter wavelength makes it possible to record and reproduce (or that is, to write and read) higher-density information, as the laser ray shall have a smaller spot diameter. The track pitch P of DVD is 0.74 $\mu$m, which is about ½ of the track pitch (1.6 $\mu$m) of conventional CD. Therefore, the recording density of DVD is greatly increased.

On the other hand, high-density rewritable optical discs (so-called DVD-RAM), of which the guide grooves formed on the substrate have a track pitch P of 1.48 $\mu$m and a groove width of 0.74 pm. For information recording on those optical discs, a laser ray having the same wavelength as that for DVD noted above is irradiated to both the inside of the guide grooves (hollows) and the top between the adjacent guide grooves (hills), to thereby accomplish information writing and rewriting through phase conversion (see, for example, Asakura's "DVD", pp. 126–134, published by Ohm Co., 1996). DVD-RAM of that type has the same outer diameter (120 mm) as CD, but has a recording density (2.6 GB on one surface) of about 4 times that of CD. The substrate for DVD-RAM has a thickness of 0.6 mm, and two substrates each having a thickness of 0.6 mm are laminated to construct DVD-RAM. In addition, ultra-high recording-density optical discs comprising a substrate that has a diameter of 120 mm and a thickness of 0.6 mm are being investigated, on which information is recorded and reproduced with a blue laser ray having a shorter wavelength (about 400 nm).

On the other hand, another trial is being made for increasing the density of optical discs of which the thickness is 1.2 mm like that of conventional CD, etc. For example, rewritable optical discs (CD-R) have been proposed, which have grooves having a track pitch width of from 0.3 to 0.6 $\mu$m and a depth of from 170 to 250 nm, or pits having a width of from 0.4 to 0.7 $\mu$m and a depth of from 280 to 400 nm formed on a substrate having a thickness of 1.2 mm (see, for example. Japanese Patent Application Laid-Open (JP-A) Hei-9-7232).

For producing substrates for high-density optical discs such as DVD and others which are being much developed in those days, a 2P method (photopolymerization method) is being investigated, which comprises forming a UV-curable monomer layer on a transparent substrate such as a plastic substrate or the like, then airtightly applying a stamper having a reverse pattern for the fine structure of pits (or guide grooves) to the UV-curable monomer layer, and exposing the UV-curable monomer layer to UV rays via the substrate to thereby polymerize and cure the monomers in the layer to form pits (or guide grooves) on the substrate (for example, see JP-A Hei-9-106585). According to the 2P method for producing optical disc substrates, it is possible to make the UV-curable monomer having a low viscosity reach the deepest site of the fine structure for pits (or guide grooves) as formed on the stamper. In that method, the UV-curable monomer having been spread to the deepest site of the fine structure for pits (or guide grooves) is cured, and therefore, it is possible to make the substrates have the fine shape of pits (or guide grooves) transferred thereon with high accuracy. However, the 2P method for producing optical disc substrates is problematic in that the mass-producibility therein is lower than that in an injection-molding method for producing substrates, and that the production costs for it are high.

FIG. 4 is a schematic view showing the production of an optical disc substrate through injection molding, in which a synthetic resin being injected via the nozzle tip of a molding machine is charged into a cavity (optical disc substrate-shaped space). In the injection-molding method for producing optical disc substrates, a stamper 4 having a reverse pattern for the fine structure of pits (or guide grooves) formed on its surface is disposed in a mold 3 to give the cavity 7. In producing optical disc substrate in the method, the mold 3 is controlled at a predetermined temperature and clamped, and a synthetic resin 6 having been injected via the nozzle tip of a molding machine is charged into the cavity 7. After the synthetic resin 6 has reached the deepest end of the cavity 7 (this corresponds to the outer edge of the substrate being formed), it is compressed into the fine structure for pits or others of the stamper. Next, this is kept as such for a predetermined period of time to thereby cool and solidify the entire resin in the cavity including the resin to be the center of the substrate, whereby the fine structure of the stamper is transferred onto the solidified resin. Next, the clamped mold 3 is opened, and the optical disc substrate formed Is taken out of the mold 3. In the injection-molding method for producing optical disc substrates, when the resin having been charged into the cavity is contacted with the wall of the mold (the wall forms the cavity), the heat of the resin is transferred to the cavity wall immediately after the contact. With the decrease in the resin temperature, the viscosity of the resin increases. As a result of the transference of the resin heat to the cavity wall, formed is a cooled and solidified layer 5. With the growth of the layer 5, the cavity 7 is filled with the resin. The problem of the reduction in the pattern transferability due to the formation of the cooled and solidified layer in the injection-molding method noted above is seen also in injection-compression molding for producing high-density optical disc substrates.

The injection-molding method has the advantages of good mass-producibility and low production costs. However, the cooled and solidified layer formed in the method brings about the problem of retarding the pattern transferability and increasing the birefringence of the substrate formed, whereby the quality of the substrate is lowered. Where high-density optical disc substrates having finer pits (or guide grooves) than those of conventional ones are produced in the injection-molding method, the problems to be caused by the formation of the cooled and solidified layer will be more serious.

Specifically, with the increase in the density of the pattern for pits (or guide grooves) formed on the surface of the stamper to be used, the resin could hardly enter the depth of the hollows of the fine structure of the pattern thereby often causing transfer failure. For example, even when substrates for DVD-RAM, which are for recording on both the inside of the guide grooves (hollows) and the top between the adjacent guide grooves (hills) through phase conversion, are intended to be formed under the conventional injection-molding conditions, the resin could hardly enter the space to be between the adjacent guide grooves and therefore good hills could not be formed on the substrates. Even if the substrates with such no good fills thereon are used to produce optical discs, good recording and reproduction on the discs produced is impossible and the discs are failed products.

In order solve this problem, a method for producing thin substrates for optical discs through injection-compression molding has been developed, in which the temperature of the mold is set higher than that in conventional methods and the clamping force for the mold is switched during molding operation (see, for example, JP-A Hei-7-176085). The method may be effective for preventing the increase in the viscosity of the resin being charged into the mold and for reducing the birefringence of the substrates produced. However, for the method, the substrate material is limited to only a specific molding resin. In addition, in this method, since the mold temperature is high, the substrates released from the mold after having been cooled and solidified are easily deformed. Moreover, still another problem with the method is that the cooling time in the method must be long and the molding cycle is prolonged.

On the other hand, it is written in "Reports in Optical Memory Symposium '86", page 173 and the following pages, that (1) a polycarbonate resin is injection-molded into optical disc substrates (CD substrates) having a diameter of 130 mm and a thickness of 1.2 mm, at a resin filling rate of 79 $cm^3$/sec, and (2) a polymethyl methacrylate resin is injection-molded into optical disc substrates (CD substrates) having the same diameter and thickness as above, at a resin filling rate of 61 $cm^3$/sec. In "Polymer Reports", Vol. 49, No. 8, page 703 and the following pages, a reference is made to the production of CD substrates. Briefly, they say therein that the increase in the resin filling rate in producing CD substrates is effective for improving the pattern transferability onto the substrates. However, there is found no literature that suggests the relationship between the pattern transferability and the resin filling rate in injection-molding for producing high-density optical disc substrates, such as DVD substrates which are more small-sized and thinner than conventional optical disc substrates. Further the technologies described in above two literature are related to disc substrates (CD substrates) having a thickness of 1.2 mm. In case of injection molding of such thick substrates at a resin filling rate of about 60 $cm^3$/sec, resin filling time is required about 2 seconds, so the resin temperature decreases and the viscosity of the resin increases while the resin is filled up. The increase of the viscosity of the resin causes the lowered pattern transferability.

SUMMARY OF THE INVENTION

The present invention has been made in consideration of the problems noted above, and its object is to provide a method for producing optical disc substrates having a lowered degree of birefringence, in which the pattern transferability onto the substrates produced is high and the mass-producibility of the substrates is also high.

In order to attain the object, the invention provides a method for producing optical disc substrates having a diameter of from 80 to 120 mm and a thickness of from 0.5 to 0.7 mm, through injection molding or injection-compression molding, which is characterized in that a resin for the substrates is injected and charged into the cavity of a mold at a resin filling rate of not lower than 65 $cm^3$/sec, said resin filling rate being obtained by dividing the cavity volume ($cm^3$) of the mold, into which the resin is charged, by the time (sec) taken from the start of resin injection through the tip of the nozzle of the injection-molding machine to the arrival of the resin at the deepest end of the cavity of the mold. Preferably, the resin filling rate is not lower than 80 $cm^3$/sec. The resin filling rate of not lower than 65 $cm^3$/sec is roughly converted into the resin filling time of not upper than 0.1 seconds. The resin filling rate of not lower than 80 $cm^3$/sec is roughly converted into the resin filling time of not upper than 0.08 seconds.

The resin filling rate is so settled that the melt viscosity of the resin is within the range of from 1 to 30 Pa·s, within the period of time of from the start of resin injection through the tip of the nozzle of the injection-molding machine to the arrival of the resin at the deepest end of the cavity of the mold. Also preferably, the resin filling rate is so settled that the temperature of the resin having been charged into the cavity to be around the inner surface of the mold is higher than the flow-stopping point of the resin, at which the resin of being in a gum-like flat range changes to be within a transition range, within the period of time of from the start of resin injection through the tip of the nozzle of the injection-molding machine to the arrival of the resin at the deepest end of the cavity of the mold. The resin around the inner surface of the mold as referred to herein is meant to indicate the surface part of the resin being in the mold cavity and having a depth of not larger than 10 $\mu$m from the inner surface of the mold.

BRIEF DESCRIPTION OF THE DRAWINGS

In FIGS. 3 and 4, 1 is a guide groove, 2 is the top between the adjacent guide grooves, 3 is a mold, 4 is a stamper, 5 is a cooled and solidified layer, 6 is a resin melt, and 7 is a cavity.

DETAILED DESCRIPTION OF THE INVENTION

PMMA is used as the material for optical disc substrates. Its temperature-dependent elasticity was measured, and the data obtained were plotted to give the curve shown in FIG. 1. With the decrease in the resin temperature, the resin, PMMA of being In a gum-like flat range changed to be in a vitreous condition via the transition region. The temperature at which the resin of being in a gum-like flat range changes to be within a transition region Is referred to a s a flow-stopping point of the resin. As in FIG. 1, the flow-stopping point of PMMA is 128° C. The resin of which the temperature is not higher than its flow-stopping point does not flow. Therefore, where substrates for optical discs are formed from a resin in an injection molding method or the like, fine pits (or guide grooves) could not be transferred onto the substrates when the temperature of the resin is lower than the flow-stopping point thereof. In the method, immediately after the filling of the resin into the mold, the viscosity of the resin having been filled varies in different sites in the direction of the thickness of the optical disc substrate to be formed, or that is, the viscosity of the resin in the region nearer to the inner surface of the mold is higher. While the stamper pattern is transferred onto the resin substrate by compression, the resin is cooled and solidified while receiving high shear force, resulting in that the residual stress in the resin being solidified is increased. As a result, the degree of birefringence of the cooled and solidified resin substrate shall be large.

Figure 1:
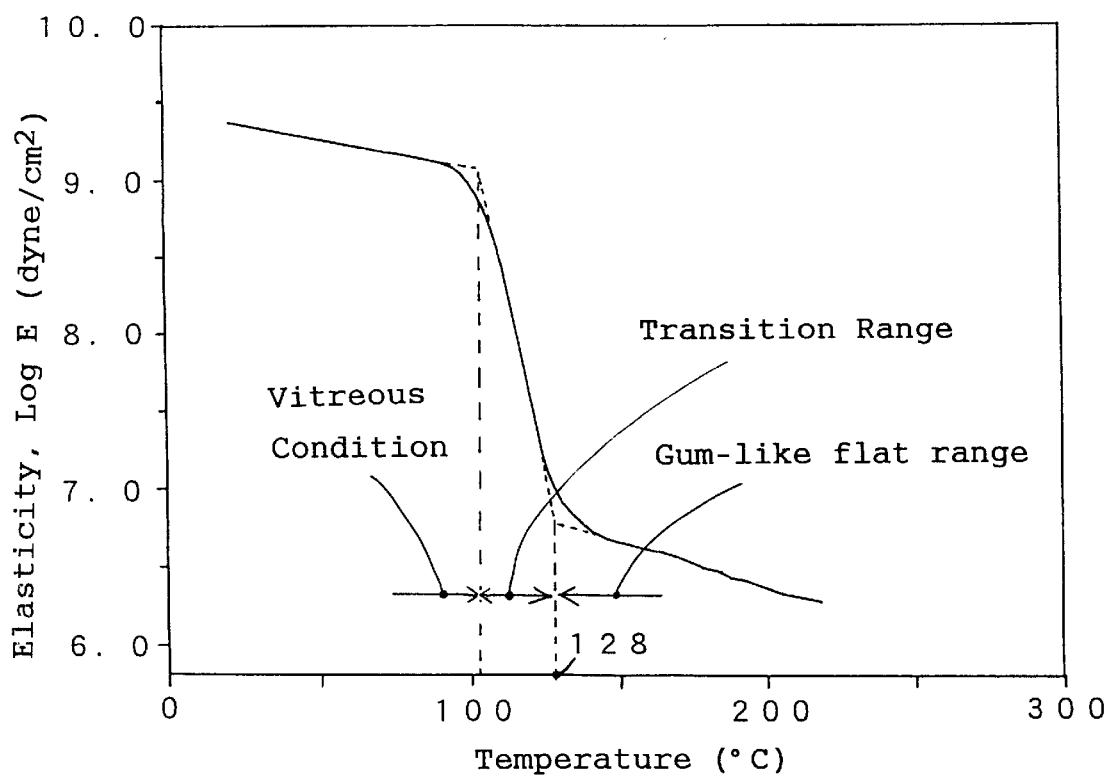
FIG. 1 is a graph showing the temperature-dependent change in the visco-elasticity of PMMA.
Figure 2:
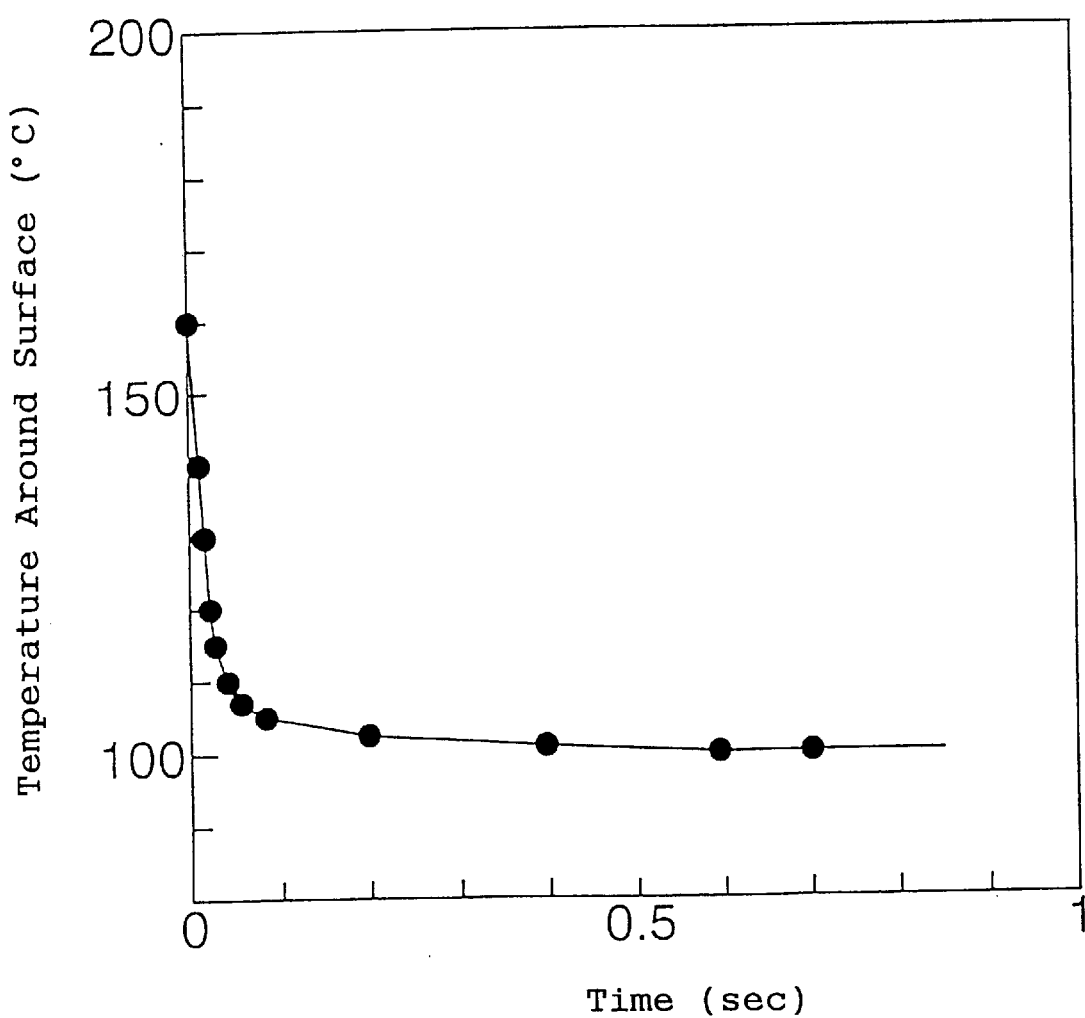
FIG. 2 is a graph showing the simulation data of the time-dependent change in the temperature around the surface of a molded product of PMMA.
Figure 3:
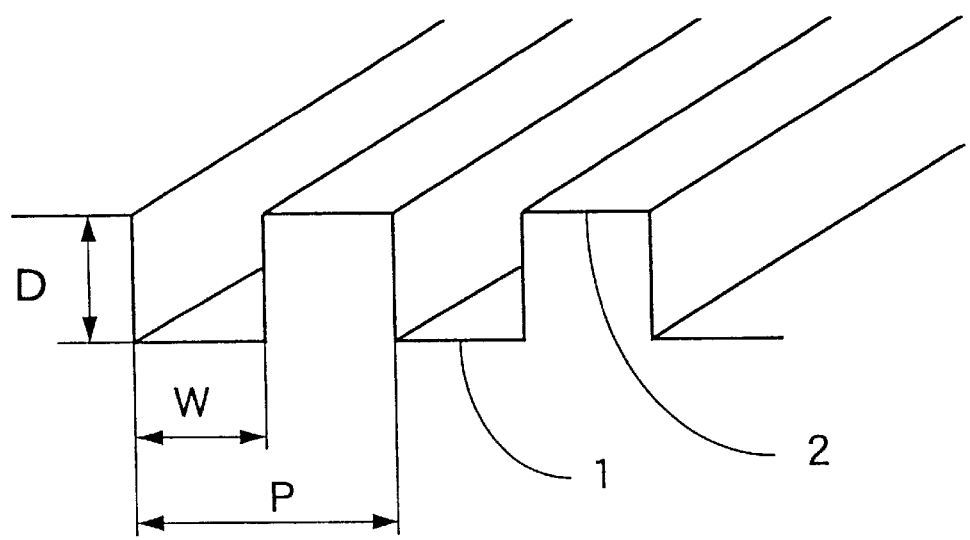
FIG. 3 is a schematic perspective view showing the cross-sectional structure of pits or guide grooves as formed on the surface of an optical disc substrate.
Figure 4:
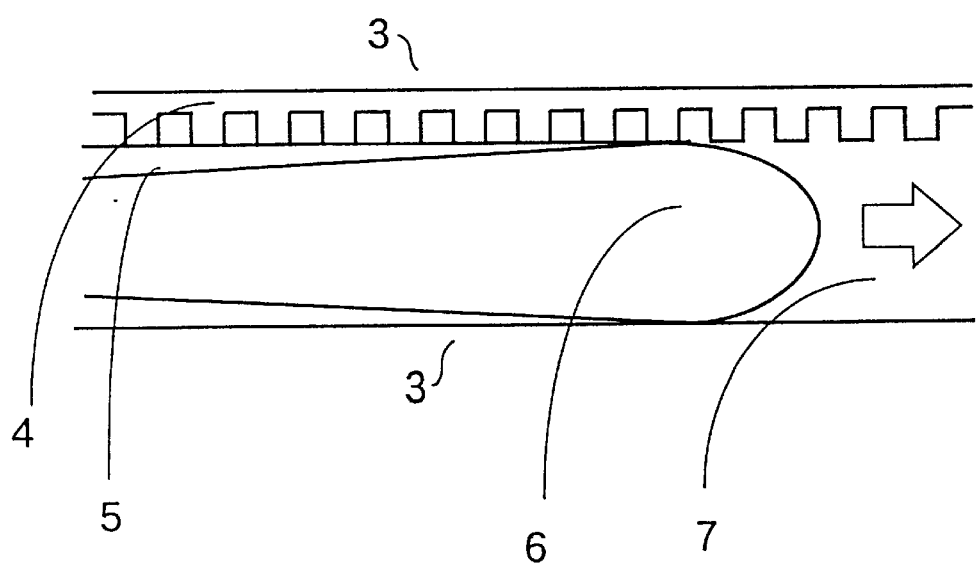
FIG. 4 is a schematic cross-sectional view showing the production of an optical disc substrate through injection molding, in which a synthetic resin being injected via the nozzle tip of a molding machine is charged into the cavity of the mold.

In FIG. 2, plotted are the data of PMMA, which is the same as that used in obtaining the data in FIG. 1. In this, the data were obtained through cooling analysis simulation by computer, and show the relationship between the time (seconds) from the start of resin injection for injection molding or injection-compression molding and the temperature (° C.) of the resin around the inner surface of the mold (the surface part of the resin being in the mold cavity and having a depth of 10 $\mu$m from the inner surface of the mold). The simulation made herein was for non-steady heat conduction analysis using MARC, in which the temperature of the resin being injected was 280° C., and the temperature of the mold (this was made of carbon steel having a heat conductivity of $1060\times10^{-5}$ cal/mm/sec/° C.) was 85° C. As in FIG. 2, it is known that the temperature of the resin at the depth of not larger than 10 $\mu$m from the inner surface of the mold, which has an influence on the fine pattern transferability onto the surface of the resin substrate, becomes lower than the flow-stopping point (128° C.) of the resin in about 0.1 seconds after the resin has begun to be in contact with the inner surface of the mold. Where the resin is formed into optical disc substrates according to the injection molding or injection-compression molding method under the same condition as that for the simulation noted above, the viscosity of the resin having been charged into the mold cavity shall be greatly increased if the resin filling rate is so low that the introduction of the resin to the deepest end of the cavity takes about 0.1 seconds or longer In that case, the flow-stopping region of the resin will appear on a part of the pattern-transferred surface of the optical disc substrate before the resin could reach all the deepest sites of the fine structure formed on the stamper (that is, before the resin could reach the bottom of each hollow of the pattern formed on the stamper, in which the hollows correspond to the hills of the resin substrate to be formed). As a result, even if the resin is pressed against the stamper in order to transfer the fine pattern of the stamper onto the resin surface, transfer failure is inevitable. In addition, in that case, the degree of birefringence of the optical disc substrate formed shall be enlarged.

In the method for producing optical disc substrates of the invention, it is desirable that the resin filling rate is settled so high that the temperature of the resin having been charged into the cavity to be around the inner surface of the mold is higher than the flow-stopping point of the resin, at which the resin of being in a gum-like flat range changes to be within a transition range, during the injection charging of the resin into the mold cavity, or that is, within the period of time of from the start of resin injection through the tip of the nozzle of the injection-molding machine to the arrival of the resin at the deepest end of the cavity of the mold. Specifically, in the method of the invention for producing optical disc substrates having a diameter of from 80 to 120 mm and a thickness of from 0.5 to 0.7 mm, the resin filling rate is a high rate of not lower than 65 cm$^3$/sec, preferably not lower than 80 cm$^3$/sec. Accordingly, in the method, the resin having been charged into the cavity can reach the deepest end of the cavity while its temperature is not still lower than the flow-stopping point of the resin, resulting in that the viscosity of the resin being pressed against the stamper to enter the depth of each hollow of the fine structure pattern for pits (or guide grooves) formed on the surface of the stamper is kept low.

In the present invention, the melt viscosity of the resin is preferably within the range of from 1 to 30 Pa·s, within the period of time of from the start of resin injection through the tip of the nozzle of the injection-molding machine to the arrival of the resin at the deepest end of the cavity of the mold. When the resin is PMMA, the melt viscosity of PMMA is preferably within the range of from 3 to 6 Pa·s. When the resin is PC, the melt viscosity of PC is preferably within the range of from 5 to 15 Pa·s. The melt viscosity as referred to herein is meant to the calculated value from the relationship between shearing velocity and viscosity within the period of time of from the start of resin injection through the tip of the nozzle of the injection-molding machine to the arrival of the resin at the deepest end of the cavity of the mold. The shearing velocity is calculated from the shape of flow path of the mold and the flow velocity of the melted resin. The relationship between the shearing velocity and the viscosity at molding temperature is measured by the fixed speed system capillary rheometer for the small hole flow test method, which is widely used. Further the melt viscosity of the resin within the period of time of from the start of resin injection through the tip of the nozzle of the injection-molding machine to the arrival of the resin at the deepest end of the cavity of the mold can be analyzed by the resin flow analyzing simulation system of General Electric (GE) Co., which is one of the resin flow computer analyzing simulation system for designing the mold for injection molding of a thermoplastic resin.

The substrate produced according to the method of the invention may be laminated with a reflective thin film, a recording thin film and others, depending on its use, to form a single-sided optical disc. Two substrates each laminated with a reflective thin film, a recording thin film and others may be combined together to form a double-sided optical disc.

In the invention, employable is any resin transparent to the wavelengths of laser rays for information recording and reproduction and capable of being molded through injection molding or injection-compression molding. Concretely, the resin includes, for example, acrylic resins such as polymethyl methacrylate (PMMA), etc., as well as polycarbonate (PC) resins, polyolefin resins, polystyrene resins, polyester resins, etc.

Now, the invention is described in more detail with reference to the following Examples and Comparative Examples, which, however, are not intended to restrict the scope of the invention. In those Examples and Comparative Examples, used was an injection-molding machine of Fanac's Roboshot α-50B. Precisely, a discoid stamper was fitted to the mold, in which were molded optical disc substrates having a diameter of 120 mm and a thickness of 0.6 mm through injection-compression molding. The stamper has a reverse pattern for guide grooves having a track pitch of 1.0 μm, a groove width of 0.5 μm and a depth of 150 nm, within the radial range of from 23 mm to 58 mm. As the molding material, used was an acrylic resin (Kuraray's Parapet H-1000SD).

On the surface of each substrate thus molded, formed was a platinum film having a thickness of about 10 nm through sputtering, and the cross-sectional profile of the guide grooves formed thereon was measured with a scanning tunnel microscope (STM). For this, two points were checked, one being near the inner circumference (at a radius of about 24 mm) and the other being near the outer circumference (at a radius of about 57 mm). From the data of the cross-sectional profile thus measured, obtained was the groove depth. The thus-obtained groove depth was divided by the groove depth of the stamper at the same position, and the percentage of the resulting value was obtained. This is hereinafter referred to as "degree of pattern transference". In addition, using Mizoziri Optical's Ellipsometer DVD-36L, the birefringence distribution in the radial direction of each substrate molded herein was measured. The timing for switching the primary clamping force to the secondary clamping force in the process of Examples and Comparative Examples was immediately after gate cutting of the spool part at the end of the pressure retention.

The molding conditions for Examples 1 to 6 and Comparative Examples 1 to 3 are shown in Table 1 below. The results of the tests for evaluating the properties of the substrates obtained in Examples 1 to 6 and Comparative Examples 1 to 3 are shown in Table 2 below. In the mold used in Examples, the resin filling is finished within 0.1 seconds when the resin filling rate is 65 cm³/sec, or within 0.08 seconds when the resin filling rate is 80 cm³/sec. In Table 1, the column for the clamping pressure indicates the pressure in the filling and pressing step, that in the initial cooling step, that in the middle cooling step, and that in the last cooling step, in that order. The melt viscosity of the resin for Examples 1 to 5, in which cylinder temperature is each not lower than 285° C. and mold temperature are not lower than 80° C., is each not lower than 3 Pa·s within the period of time of from the start of resin injection through the tip of the nozzle of the injection-molding machine to the arrival of the resin at the deepest end of the cavity of the mold. The melt viscosity of the resin for Example 6, in which cylinder temperature is 280° C. and mold temperature is 80° C., is not lower than 5 Pa·s.

TABLE 1

| | Resin Filling Rate (cm³/sec) | Cylinder Temperature (° C.) | Mold Temperature (° C.) | Resin Filling Time (sec) | Clamping Pressure (ton) |
|---|---|---|---|---|---|
| Example 1 | 65 | 285 | 85 | 0.10 | 17 → 27 → 24 → 0 |
| Example 2 | 65 | 290 | 87 | 0.10 | 17 → 27 → 24 → 0 |
| Example 3 | 80 | 285 | 80 | 0.08 | 22 → 32 → 27 → 0 |
| Example 4 | 80 | 285 | 85 | 0.08 | 22 → 32 → 27 → 0 |
| Example 5 | 80 | 290 | 87 | 0.08 | 22 → 27 → 24 → 0 |
| Example 6 | 80 | 280 | 80 | 0.08 | 17 → 27 → 24 → 0 |
| Comparative Example 1 | 55 | 290 | 87 | 0.12 | 22 → 32 → 27 → 0 |
| Comparative Example 2 | 48 | 290 | 87 | 0.14 | 22 → 32 → 27 → 0 |
| Comparative Example 3 | 35 | 280 | 80 | 0.18 | 22 → 27 → 24 → 0 |

TABLE 2

| | Degree of Pattern Transference (%) | | Birefringence (nm) | | |
|---|---|---|---|---|---|
| | inner circumference | outer circumference | inner circumference | center circumference | outer circumference |
| Example 1 | 100 | 95 | 15 | 10 | 5 |
| Example 2 | 100 | 95 | 15 | 10 | 5 |
| Example 3 | 100 | 100 | 10 | 10 | 5 |
| Example 4 | 100 | 100 | 10 | 10 | 5 |
| Example 5 | 100 | 100 | 10 | 10 | 5 |
| Example 6 | 95 | 90 | 15 | 10 | 5 |
| Comparative Example 1 | 100 | 70 | 12 | 10 | 0 |
| Comparative Example 2 | 100 | 60 | 13 | 10 | 0 |
| Comparative Example 3 | 80 | 50 | 20 | 15 | 5 |

As is obvious in Table 2, the thin, optical disc substrates obtained in Examples of the invention all have improved pattern transferability, as compared with those obtained in Comparative Examples, and each has a degree of pattern transference of 100% throughout from its inner circumference to its outer circumference. Further optical disc substrates obtained in Examples 1 to 5, in which melt viscosity of PMMA is each within the range of from 3 to 5 Pa·s, each has a degree of pattern transference of 100% throughout from its inner circumference to its outer circumference.

As has been mentioned in detail hereinabove, injection molding or injection-compression molding with good mass-producibility is employed in the method of the invention, in which are produced good substrates for optical discs without lowering the pattern transferability thereon even when stampers with higher density for pits (or guide grooves) are used than those for conventional CD.

While the invention has been described in detail and with reference to specific embodiments thereof, it will be apparent to one skilled in the art that various changes and modifications can be made therein without departing from the spirit and scope thereof.

What is claimed is:

1. A method for producing optical disc substrates having a diameter of from 80 to 120 mm and a thickness of from 0.5 to 0.7 mm, comprising charging and injection molding or injection-compression molding an acrylic resin for the substrates into the cavity of a mold at a resin filling time of not greater than 0.08 seconds, wherein a melt viscosity of the resin is within the range of from 3 to 6 Pa·s, within the period of time of from the start of a resin injection through the tip of the nozzle of the injection-molding machine to the arrival of the resin at the deepest end of the cavity of the mold, wherein the temperature of the resin charged into the cavity near/around the inner surface of the cavity is higher than the flow-stopping point of the resin, the point at which the resin being in a gum flat range changes to be within a transition range, within the period of time of from the start of resin injection through the tip of the nozzle of the injection-molding machine to the arrival of the resin at the deepest end of the cavity.

2. A method for producing optical disc substrates having a diameter of from 80 to 120 mm and a thickness of from 0.5 to 0.7 mm, comprising charging and injection molding or injection-compression molding an acrylic resin for the substrates into the cavity of a mold at a resin filling rate of not lower than 65 cm$^3$/sec, said resin filling rate being obtained by dividing the cavity volume (cm$^3$) of the mold, into which the resin is charged, by the time (sec) taken from the start of resin injection through the tip of the nozzle of the injection-molding machine to the arrival of the resin at the deepest end of the cavity of the mold, wherein a melt viscosity of the resin is within the range of from 3 to 6 Pa·s, within the period of time of from the start of resin injection through the tip of the nozzle of the injection-molding machine to the arrival of the resin at the deepest end of the cavity of the mold.

3. The method of claim 2, wherein the resin filling rate is not lower than 80 cm$^3$/sec.

4. A method for producing optical disc substrates having a diameter of from 80 to 120 mm and a thickness of from 0.5 to 0.7 mm, comprising charging and injection molding or injection-compression molding an acrylic resin for the substrates into the cavity of a mold at a resin filling time of not greater than 0.1 seconds, wherein a melt viscosity of the resin is within the range of from 3 to 6 Pa·s, within the period of time of from the start of resin injection through the tip of the nozzle of the injection-molding machine to the arrival of the resin at the deepest end of the cavity of the mold.

5. The method of claim 4, wherein the resin filling time is not greater than 0.08 seconds.

\* \* \* \* \*